(12) United States Patent
Morais et al.

(10) Patent No.: US 7,565,537 B2
(45) Date of Patent: *Jul. 21, 2009

(54) SECURE KEY EXCHANGE WITH MUTUAL AUTHENTICATION

(75) Inventors: Dinarte R. Morais, Redmond, WA (US); Ling Tony Chen, Bellevue, WA (US); Damon V. Danieli, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 761 days.

This patent is subject to a terminal disclaimer.

(21) Appl. No.: 10/170,002

(22) Filed: Jun. 10, 2002

(65) Prior Publication Data

US 2003/0229789 A1    Dec. 11, 2003

(51) Int. Cl.
- G06F 21/00 (2006.01)
- H04L 9/28 (2006.01)
- H04K 1/00 (2006.01)
- G06F 17/00 (2006.01)
- A63F 9/00 (2006.01)

(52) U.S. Cl. .............. 713/169; 713/179; 713/181; 726/10; 380/251; 463/29

(58) Field of Classification Search .............. None
See application file for complete search history.

(56) References Cited

U.S. PATENT DOCUMENTS

| | | | |
|---|---|---|---|
| 4,200,770 | A | 4/1980 | Hellman et al. |
| 5,764,887 | A | 6/1998 | Kells et al. |
| 5,778,065 | A | 7/1998 | Hauser et al. |
| 6,330,562 | B1 | 12/2001 | Boden et al. |
| 6,468,160 | B2 | 10/2002 | Eliott |
| 6,712,704 | B2 | 3/2004 | Eliott |
| 6,718,467 | B1 * | 4/2004 | Trostle .................. 713/171 |
| 6,766,453 | B1 * | 7/2004 | Nessett et al. ............ 713/171 |
| 6,769,989 | B2 | 8/2004 | Smith et al. |
| 6,792,534 | B2 * | 9/2004 | Medvinsky ............. 713/171 |

(Continued)

FOREIGN PATENT DOCUMENTS

EP      1 134 929 A1      9/2001

(Continued)

OTHER PUBLICATIONS

Kohl & Neuman, RFC 1510: "The Kerberos Network Authentication Service (V5)", http://www.ietf.org/rfc.rfc1510.txt, Sep. 1993, pp. 6, 20-24, 32, 47-48, 57, 60, 68-70, and 107.*

(Continued)

*Primary Examiner*—Christopher A Revak

(57) ABSTRACT

A secure key exchange with mutual authentication allows devices on a network to perform, in a single roundtrip over the network, the exchange. A key exchange initiator packet that does not include a key to be established is sent from an initiating device to another device via a network. The key exchange initiator packet is validated and the other device generates the key without requiring any additional packets to be received from the initiating device in order to generate the key. A key exchange response packet that does not include the key is returned to the initiating device, which validates the key exchange response packet and generates the key without requiring any additional packets to be sent to the other device or received from the other device.

61 Claims, 9 Drawing Sheets

U.S. PATENT DOCUMENTS

| | | | | |
|---|---|---|---|---|
| 6,993,652 | B2* | 1/2006 | Medvinsky | 713/155 |
| 7,178,025 | B2* | 2/2007 | Scheidt et al. | 713/168 |
| 7,181,620 | B1* | 2/2007 | Hur | 713/171 |
| 2001/0021256 | A1* | 9/2001 | Menezes et al. | 380/283 |
| 2001/0047484 | A1* | 11/2001 | Medvinsky et al. | 713/201 |
| 2002/0146132 | A1* | 10/2002 | Medvinsky | 380/279 |
| 2003/0163693 | A1* | 8/2003 | Medvinsky | 713/169 |
| 2004/0078571 | A1* | 4/2004 | Haverinen | 713/168 |
| 2004/0087304 | A1* | 5/2004 | Buddhikot et al. | 455/426.2 |
| 2004/0162137 | A1 | 8/2004 | Eliott | |
| 2004/0223619 | A1* | 11/2004 | Jablon | 380/277 |
| 2005/0027985 | A1* | 2/2005 | Sprunk et al. | 713/171 |
| 2005/0097317 | A1* | 5/2005 | Trostle et al. | 713/163 |
| 2007/0043946 | A1* | 2/2007 | Lauter et al. | 713/171 |

FOREIGN PATENT DOCUMENTS

| | | |
|---|---|---|
| WO | WO 00/48358 | 8/2000 |

OTHER PUBLICATIONS

Hugo Krawczyk, "SKEME: A Versatile Secure Key Exchange Mechanism for Internet," Network and Distributed System Security, 1996, Proceedings of the Symposium on San Diego, CA, USA Feb. 22-23, 1996, Los Alamitos, CA, USA, IEEE Comput. Soc., US, Feb. 22, 1996, pp. 114-127.

Refik Molva, "Internet security architecture," Computer Networks, Elsevier Science Publishers B.V., Amsterdam, NL, vol. 31, No. 8, Apr. 23, 1999, pp. 787-804.

S. M. Bellovin, et al., "Limitations of the Kerberos Authentication System," Computer Communications Review, Association for Computing Machinery, New York, US, vol. 20, No. 5, Oct. 1, 1990, pp. 119-132.

S.H. Von Solms & M.V. Kisimov, "Information Security: Mutual Authentication in E-Commerce," Advances in Network and Distributed Systems Security, IFIP TC1 WG11.4, First Annual Working Conference on Network Security, Nov. 26-27, 2001, pp. 15-31.

Charlie Kaufman & Radia Perlman, "PDM: A New Strong Password-Based Protocol," Proceedings on the 10th USENIX Security Symposium, Aug. 13-17, 2001, pp. 313-321.

Tsang Hin Chung, Leung Kwong Sak, Lee Kin Hong, "Design & Analysis of Smart Card Based Remote Authentication Protocol for Internet-based System," Proceedings 10th IEEE Int. Workshop on Enabling Technologies: Infrastructure for Collaborative Enterprises, Jun. 20-22, 2001, pp. 229-230.

Ran Canetti, "Universally Composable Security: A New Paradigm for Cryptographic Protocols," Proceedings 42nd IEEE Symposium on Foundations of Computer Science, Oct. 14-17, 2001, pp. 136-145.

Mohammed Achemlal & Maryline Laurent, "Analysis of IPSEC Services and their Integration in an IP Virtual Private Network," Annales Des Telecommunications-Annals of Telecommunications, 2000, V 55, N7-8 (Jul.-Aug.), pp. 313-323.

Whitfield Diffie & Martin E. Hellman, "New Directions in Cryptography," IEEE Transactions on Information Theory, vol. IT-22, No. 6, Nov. 1976, pp. 644-654.

H. Krawczyk, M. Bellare & R. Canetti, Network Working Group Request for Comments: 2104, Category: Informational, "HMAC: Keyed-Hashing for Message Authentication," Feb. 1997, pp. 1-11.

* cited by examiner

SECURE KEY EXCHANGE WITH MUTUAL AUTHENTICATION

TECHNICAL FIELD

This invention relates to security and establishing secure network communications, and particularly to secure key exchange with mutual authentication.

BACKGROUND

Traditionally, gaming systems with a dedicated console were standalone machines that accommodated a limited number of players (e.g., 2-4 players). Personal computer-based gaming grew in popularity in part due to the ability to play games online with many remote players over the Internet. Thus, one trend for dedicated gaming systems is to provide capabilities to facilitate gaming over a network, such as Internet-based online gaming.

Online gaming can be implemented in a centralized-server approach or a peer-to-peer approach. In the centralized-server approach, gaming systems connect to one or more centralized-servers and interact with one another via this centralized-server(s). In the peer-to-peer approach, gaming systems connect to one another and interact with one another directly. However, even in the peer-to-peer approach, a centralized server(s) may be employed to assist in the communication, such as an initial match-making service to help gaming systems find one another.

One problem encountered in employing such a centralized server(s) is to protect network traffic between the server(s) and the gaming systems from tampering or observation by other devices on the network. Gamers are notorious for developing creative cheating mechanisms, making the network traffic a ripe target for such users. Unfortunately, previous console-based gaming systems typically did not provide for secure communications with a centralized server(s). An additional problem is that any mechanism used to protect the network traffic should not require a significant amount of the gaming system's resources, as it should devote those resources to the games being played. The mechanism also should not require a significant amount of the centralized server's resources, in order to enable more gaming systems to be handled by fewer centralized server(s).

The secure key exchange with mutual authentication described below solves these and other problems.

SUMMARY

Secure key exchange with mutual authentication is described herein.

In accordance with certain embodiments, a key exchange with a device on the network is performed in a single roundtrip over the network, achieving both mutual authentication with the device and perfect forward secrecy.

In accordance with certain embodiments, a key exchange initiator packet that does not include the key to be established is sent to a device via a network. A key exchange response packet that also does not include the key is received from the device. The key exchange response packet is validated, and the key is generated, based at least in part on data in the key exchange response packet, without requiring any additional packets to be sent to the device or received from the device in order to generate the key.

In accordance with certain embodiments, a key exchange initiator packet that does not include a key to be established is received from a device via a network and is validated. The key is generated, based at least in part on data in the key exchange initiator packet, without requiring any additional packets to be received from the device in order to generate the key. Additionally, a key exchange response packet that does not include the key is sent to the device over the network.

BRIEF DESCRIPTION OF THE DRAWINGS

The same numbers are used throughout the document to reference like components and/or features.

DETAILED DESCRIPTION

The following discussion is directed to a secure key exchange mechanism with mutual authentication for networked devices. The discussion assumes that the reader is familiar with basic cryptography principles, such as encryption, decryption, authentication, hashing, and digital signatures. For a basic introduction to cryptography, the reader is directed to a text written by Bruce Schneier and entitled, "Applied Cryptography: Protocols, Algorithms, and Source Code in C," published by John Wiley & Sons, copyright 1994 (second edition 1996), which is hereby incorporated by reference.

Figure 1:
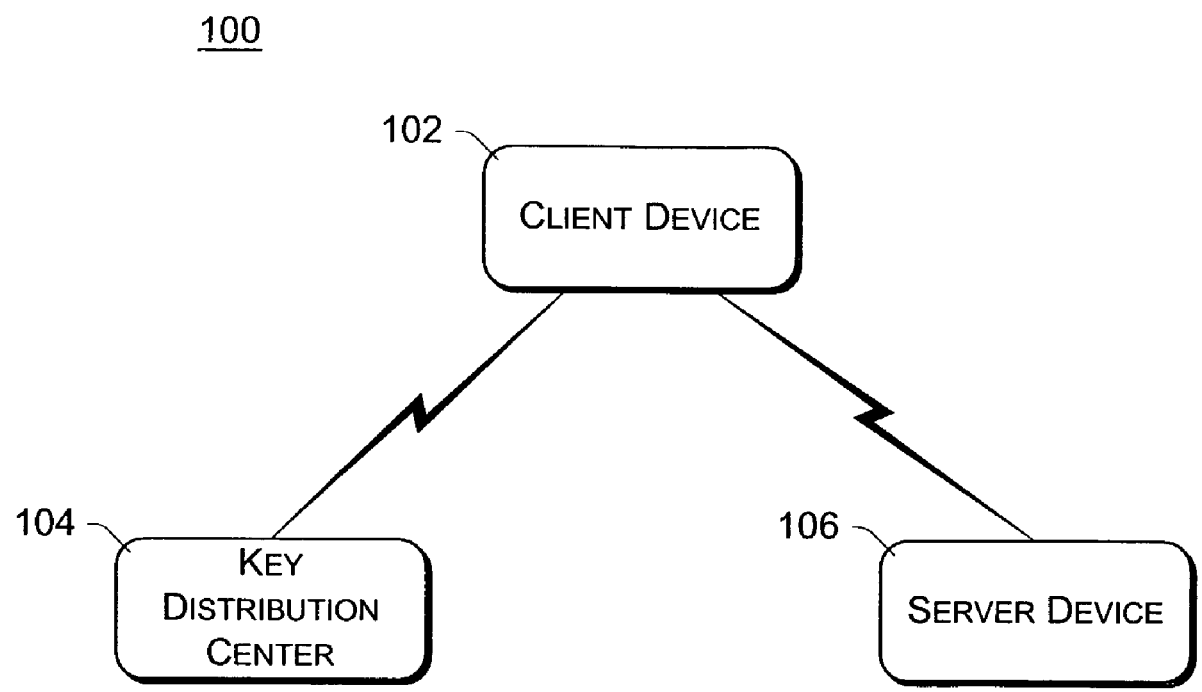
FIG. 1 is a block diagram illustrating an exemplary environment in which the secure key exchange with mutual authentication can be used.

FIG. 1 is a block diagram illustrating an exemplary environment 100 in which the secure key exchange with mutual authentication can be used. A client device 102 is coupled to a key distribution center 104 and a server device 106. The coupling between device 102 and key distribution center 104 can be any of a variety of couplings allowing communication between the device 102 and center 104. Similarly, the coupling between devices 102 and 106 can be any of a variety of couplings allowing communication between the device 102 and device 106. In one implementation, the couplings include the Internet, and may also optionally include one or more other networks (e.g., a local area network (LAN) and/or wide area network (WAN)).

Although only a single client device 102, a single center 104, and a single server device 106 are shown in FIG. 1, multiple such devices and centers may be included in environment 100. For example, multiple client devices 102 may communicate with one or more key distribution centers 104 and one or more server devices 106.

Communications between client device 102 and server device 106, as well as communications between client device 102 and key distribution center 104, can be in any of a variety of different packet formats. In one exemplary implementation, the communications are in the User Datagram Protocol (UDP) format.

Key distribution center 104 distributes keys and security tickets to client device 102 that may then be used in the secure key exchange with server device 106. Server device 106 provides services, or operates as a gateway to other devices (not shown in FIG. 1) that provide services, to client device 102.

Client device 102 can be any of a wide variety of devices. In some of the discussions herein, client device 102 is referred to as a game console. Such a game console may be a dedicated game console, or alternatively may include additional functionality. For example, the game console may include digital video recording functionality so that it can operate as a digital VCR, the game console may include channel tuning functionality so that it can tune and decode television signals (whether they be broadcast signals, cable signals, satellite signals, etc.), and so forth. Client device 102 may also be other types of computing devices, such as a desktop PC, a portable computer, a cellular telephone, an Internet appliance, a server computer, etc.

In environment 100, a secure key exchange with mutual authentication between client device 102 and server device 106 is desired. This allows devices 102 and 106 to authenticate one another, and further allows one or more cryptographic keys to be established and used as a basis for devices 102 and 106 to securely communicate with one another over an insecure network (e.g., the Internet).

In order to perform the secure key exchange with mutual authentication, a security ticket is obtained from key distribution center 104. In one exemplary implementation, the security ticket is a Kerberos ticket obtained by client device 102 using a Kerberos-like authentication protocol that authenticates, in a single ticket, the identities of the particular client device 102 and user identities of one or more users of the client device 102. Client device 102 obtains the Kerberos ticket as follows.

For discussion purposes, assume client device 102 is a game console and further assume that there are four users of the game console. Each user is given an identity $U_1$, $U_2$, $U_3$, and $U_4$ and is assigned a user key $K_1$, $K_2$, $K_3$, and $K_4$. The game console is also assigned its own identity C and a game console key $K_C$. Additionally, a game title being played on the game console, such as a game disc, is assigned a separate identity G. In a similar manner, server device 106 is assigned its own identity A and a key $K_A$. It should be noted that the authentication described herein is dependent in part on the keys $K_1$, $K_2$, $K_3$, and $K_4$, $K_C$, and key $K_A$. Therefore, care should be taken in selecting and storing these keys so that only the entities that they are assigned to are able to use them.

The game console generates validated user identities based on the user identities $U_1$, $U_2$, $U_3$, and $U_4$ and user keys $K_1$, $K_2$, $K_3$, and $K_4$. More specifically, the validated user identities include the user identities and values derived from the user keys. The validated user identities will be submitted with a request to the key distribution center 104 and used to demonstrate to the key distribution center that the game console has knowledge of the user key and hence, implicitly authenticates the users.

In order to simplify the description of the way various messages and keys are computed, we will introduce the following notation:

$H=H_{Kx}(M)$: H is a keyed one way hash (MAC) of the message M using the key $K_X$. Any MAC algorithm can be used. One example of such a MAC algorithm is the HMAC algorithm according to IETF RFC 2104.

EncryptedM=$E_{Kx}(M)$: EncryptedM is the encrypted form of message M using the key $K_X$. Any encryption algorithm can be used. Examples of such encryption algorithms include DES, triple DES, and RC4-HMAC.

One way to generate the key derivative value is to compute a cryptographic hash of the user key using the key of the game console. For user $U_1$ with key $K_1$, a hash $H_1$ is computed as follows:

$$H_1 = H_{Kc}(K_1)$$

The hash $H_1$ forms the key derivative value. Another way is to encrypt the current time using the user key $K_1$, as follows:

$$H_1 = E_{K1}(T)$$

Once again, the resulting value Hi forms the key derivative value. The validated user identity is the combination of the user identity $U_1$ and the corresponding key derivative value $H_1$:

$$\text{Validated User Identity} = (U_1, H_1).$$

The game console constructs a request containing the game console identity C, the game title identity G, the server identity A of server device 106, and multiple validated user identities $(U_1, H_1)$, $(U_2, H_2)$, $(U_3, H_3)$, and $(U_4, H_4)$. The request has the following identity string:

$$\text{Request} = [C, G, A, (U_1, H_1), (U_2, H_2), (U_3, H_3), (U_4, H_4)]$$

Additionally, the request may include a version of the authentication protocol and a random nonce generated by the game console to resist replay attacks. The request may further include a checksum value to be used to verify receipt of the entire identity string. The game console submits the request over the coupling to the key distribution center 104.

Key distribution center 104 evaluates the request as well as the identities contained in the request. Key distribution center 104 generates a random session key to be used for server device 106. In this example, the key distribution center generates a random session key $K_{CA}$ to be used by game console 102 in communicating with server device 106. This random session key $K_{CA}$ is also referred to herein as the Kerberos session key.

The key distribution center generates a ticket that will subsequently be presented by the game console to server device 106. There is one ticket issued for server device 106, but the ticket is effective for multiple users. The ticket contains the identity string submitted in the request. It also includes a time $T_G$ that the ticket is generated, a time $T_L$ identifying the time length before expiration of the ticket, and the randomly generated Kerberos session key $K_{CA}$ for server device 106. The ticket may also optionally include a service map $S_m$ identifying the service(s) and/or service devices available via server device 106 that the users of the game console are permitted to access. The key distribution center maintains a record, or accesses another device or center that maintains a record, of which users are permitted to access which services (e.g., which users have paid a premium to access one or more premium services). The ticket contents are encrypted via a symmetric key cipher (e.g., Triple DES) that utilizes the server device's key $K_A$, as follows:

$$\text{Ticket} = E_{K_A}[T_G, T_L, K_{CA}, S_m, C, G, A, U_1, U_2, U_3, U_4]$$

Notice that the ticket does not carry the corresponding key derivative values $H_i$. Once the key distribution center reads the key derivative values and believes the game console knows the user keys, the key distribution center places the identities of the users within the issued tickets. Server device 106 will subsequently believe in whatever the ticket tells it and hence does not need to see the key derivative values $H_i$.

The key distribution center returns the generated ticket to the game console. Since the game console does not know the server device's key $K_A$, the game console cannot open the ticket and alter the contents. The key distribution center also returns a session security key in an attached encrypted message. The session key message contains the ticket generation time $T_G$, the ticket expiration length $T_L$, and the session security key $K_{CA}$, and all contents are encrypted using the game console's key $K_C$, as follows:

Session Key Message=$E_{K_C}[T_G, T_L, K_{CA}]$

Since the session key message is encrypted with the game console's key $K_C$, the game console is able to open the session key message and recover the session time parameters and session keys.

Referring still to FIG. 1, once client device 102 (e.g., a game console) receives the ticket from key distribution center 104, client device 102 can use the ticket to perform the secure key exchange with mutual authentication with server is device 106. The secure key exchange with mutual authentication allows client device 102 and server device 106 to authenticate each other—client device 102 can verify that server device 106 is the server device it claims to be, and server device 106 can verify that client device 102 is the client device it claims to be. Further, each of devices 102 and 106 can verify that the other has knowledge of a particular key.

The key exchange also allows a new secret to be derived by the two devices 102 and 106 that is shared between those two devices but is not transmitted between the two devices and cannot be deduced by a third party (e.g., another device on the same network as devices 102 and 106) based on the roundtrip traffic between the devices. In one exemplary implementation, the devices use Diffie-Hellman exponentiation operations to derive the new secret. Additional information regarding Diffie-Hellman can be found in W. Diffie and M. E. Hellman, "New directions in Cryptography", IEEE Transactions on Information Theory v. IT-12, n. 6 Nov. 1976, pp. 644-654. Communications between devices 102 and 106 may be protected by encrypting the communications, or alternatively they may be performed without encryption.

Figure 2:
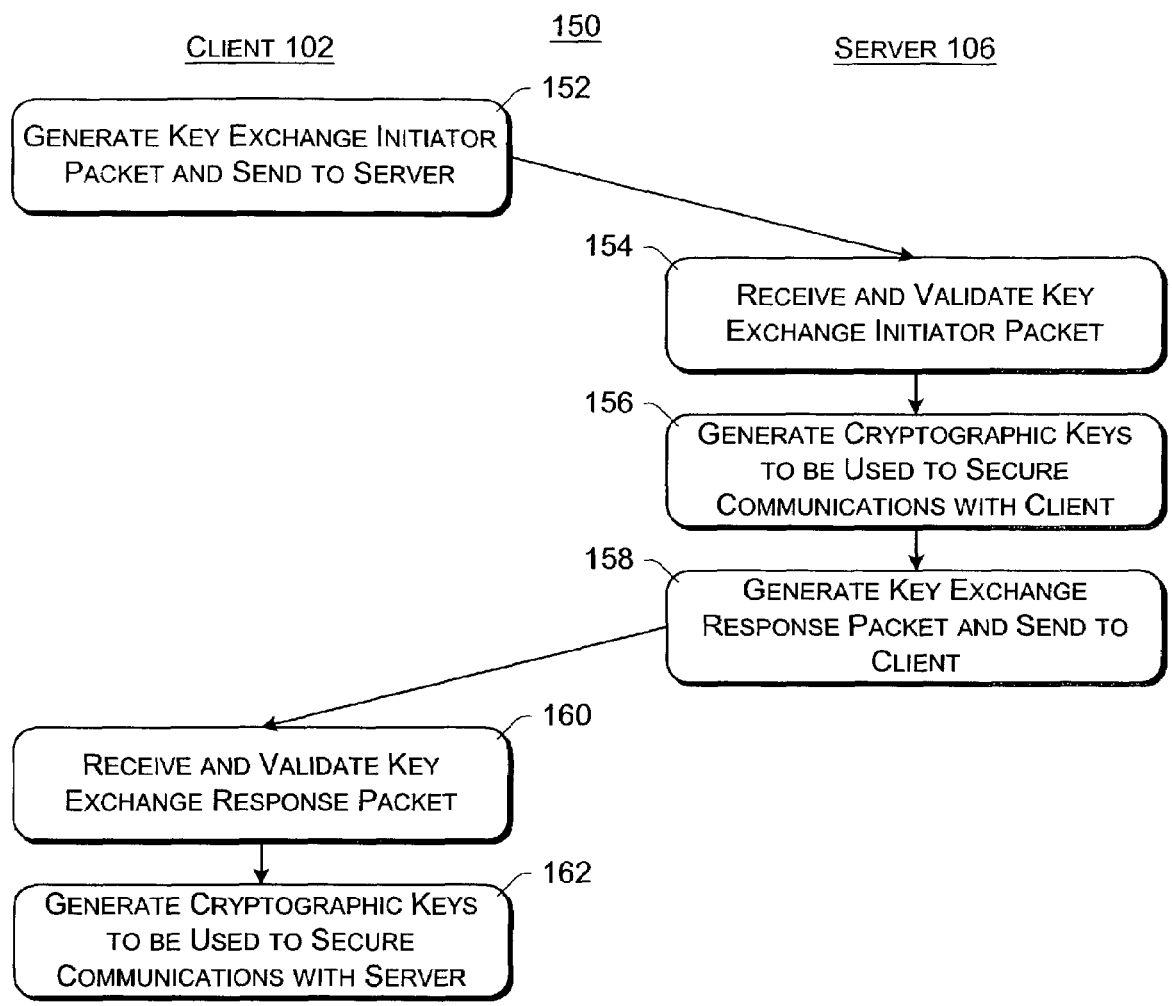
FIG. 2 is a flowchart illustrating an exemplary process for performing the secure key exchange with mutual authentication between a client and server device.

FIG. 2 is a flowchart illustrating an exemplary process 150 for performing the secure key exchange with mutual authentication between a client and server device. The process of FIG. 2 is implemented by both a client device and a server device, with operations performed by the client device being shown on the left-hand side of FIG. 2 and operations performed by the server device being shown on the right-hand side of FIG. 2. The process of FIG. 2 may be performed in software, firmware, hardware, or combinations thereof. The process of FIG. 2 is discussed with reference to components of FIG. 1. Additionally, although illustrated as a process between a client and server device, the process may be performed by any two devices desiring to establish a secure communication channel between each other (e.g., the process may be performed by two client devices or two server devices).

Initially, client device 102 generates a key exchange initiator packet and sends the packet to server device 106 (act 152). Server device 106 receives the key exchange initiator packet and validates the received packet (act 154). Once the packet is validated, server device 106 generates the cryptographic keys to be used to secure communications with client device 102 (act 156). In an exemplary implementation, these cryptographic keys are security association keys used to secure point-to-point communication between two devices.

Server device 106 then generates a key exchange response packet and sends the generated packet to client device 102 (act 158). Client device 102 receives the key exchange response packet and validates the received packet (act 160). Once the packet is validated, client device 102 generates the cryptographic keys to be used to secure communications with server device 106 (act 162). The cryptographic keys are the same as those generated by server device 106 in act 156. Thus, both client device 102 and server device 106 end up with the same cryptographic keys, but do so without actually transmitting the keys between them.

It should be noted that process 150 maintains perfect forward secrecy. Perfect forward secrecy refers to the inability of a third party to deduce a new secret even though the third party may have knowledge of a previous secret. Thus, for example, if a third party (e.g., another device) were to discover the session security key $K_{CA}$, or a previously established key between client device 102 and server device 106, then the third party would not be able to deduce the new key generated from the secure key exchange process 150. This is, for example, because the third party would not have knowledge of the Diffie-Hellman values (discussed in more detail below) being used in process 150.

Additionally, it can be seen that only two packets need be communicated between client device 102 and server device 106—the key exchange initiator packet and the key exchange response packet. Thus, a single roundtrip (a packet from client device 102 to server device 106, and a return packet from server device 106 to client device 102) is all that is needed to perform the secure key exchange with mutual authentication. This single roundtrip, by reducing the number of packets used, serves to reduce latency as well as reduce bandwidth overhead in establishing the key(s) and mutually authenticating the devices.

Figure 3:
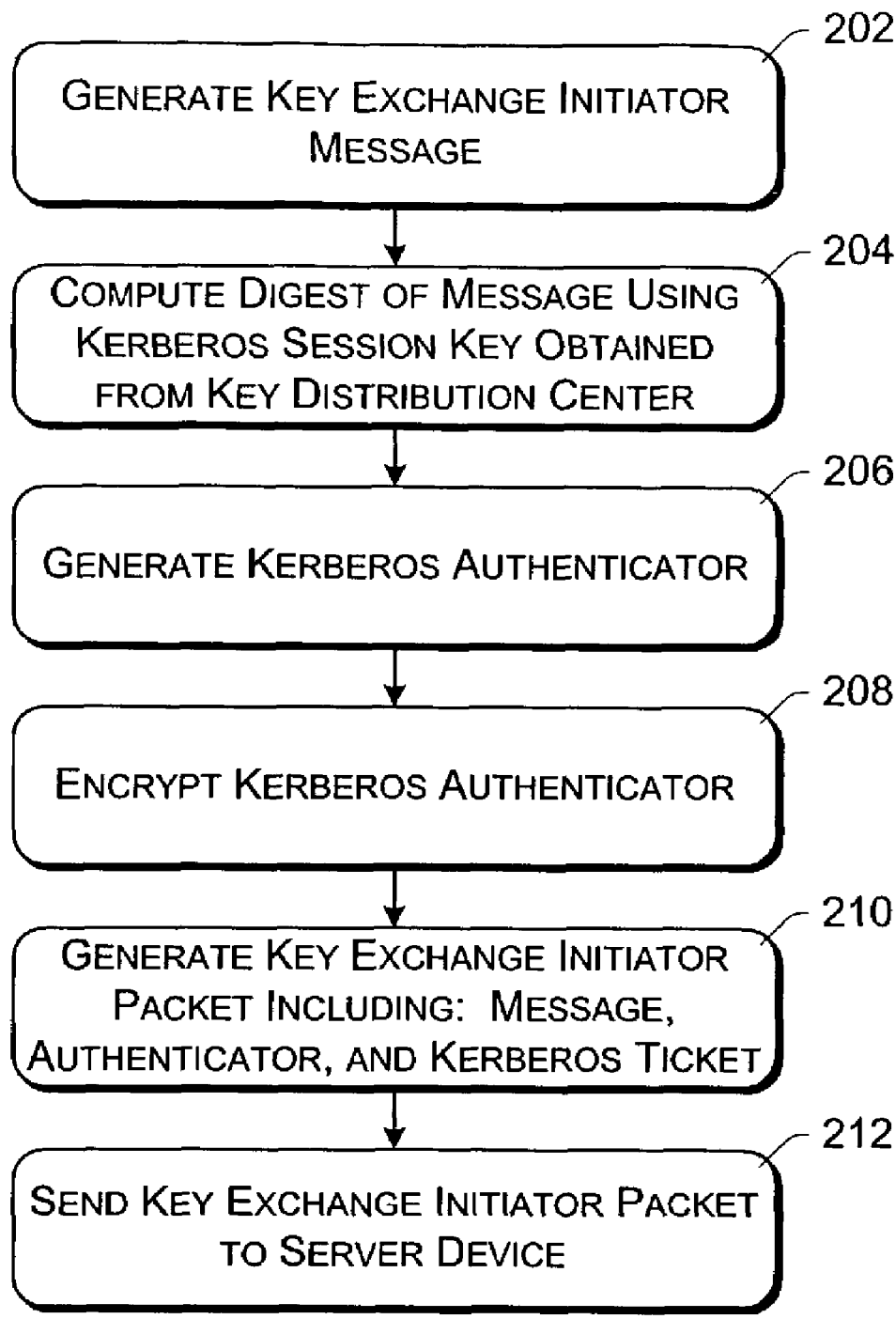
FIG. 3 is a flowchart illustrating an exemplary process for generating and sending a key exchange initiator packet.
Figure 4:
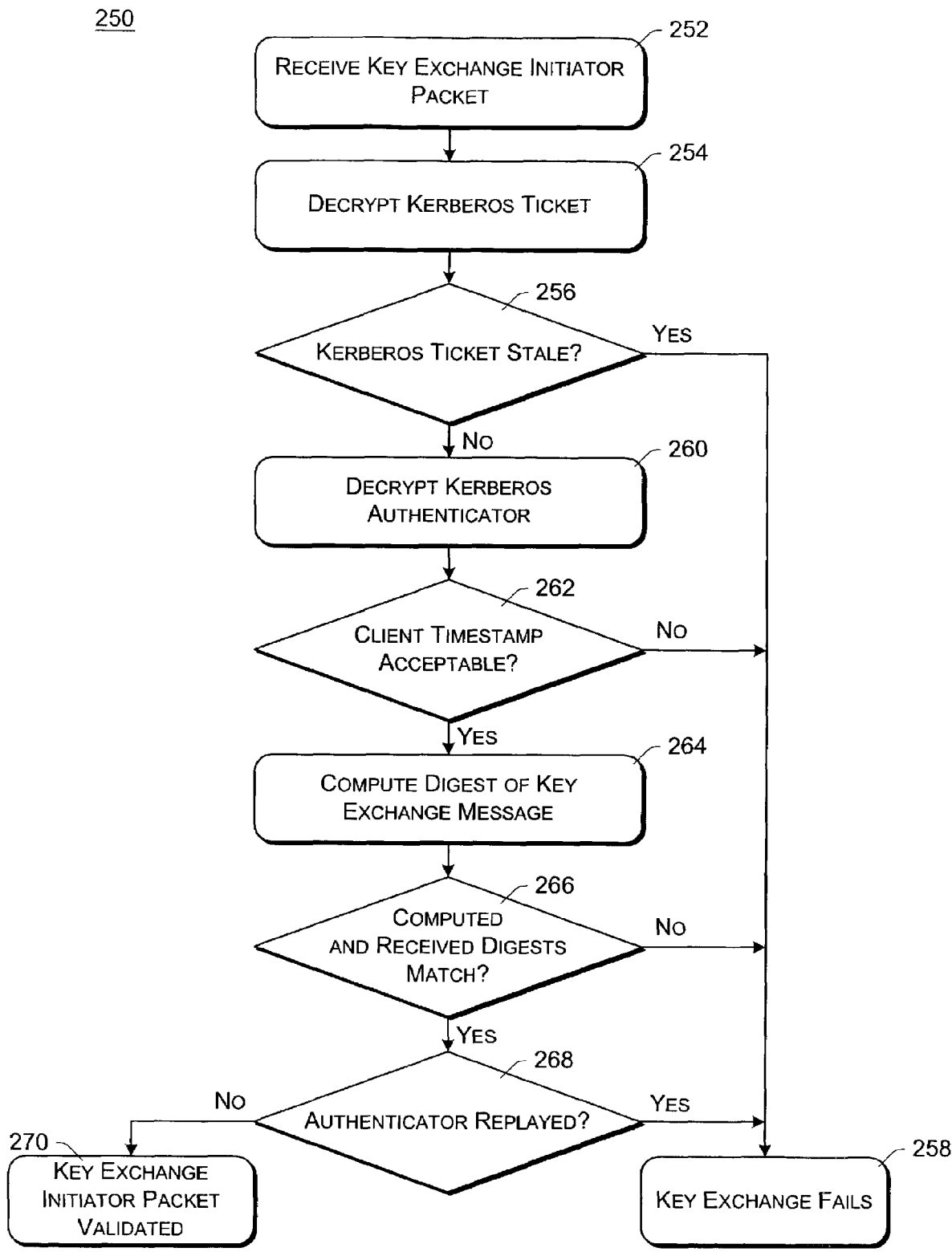
FIG. 4 is a flowchart illustrating an exemplary process for receiving and validating the key exchange initiator packet.
Figure 5:
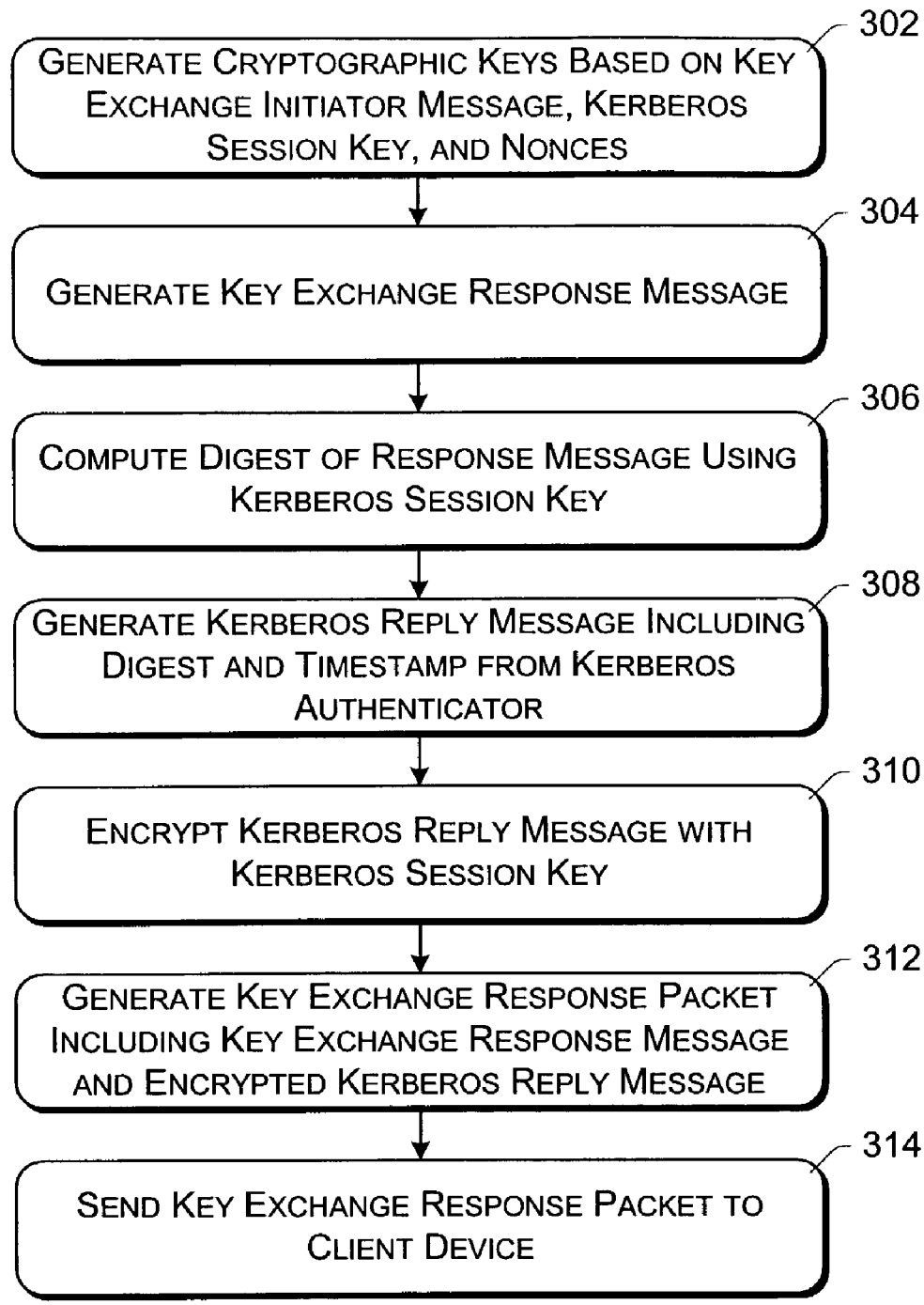
FIG. 5 is a flowchart illustrating an exemplary process for generating cryptographic keys, as well as generating and sending a key exchange response packet.
Figure 6:
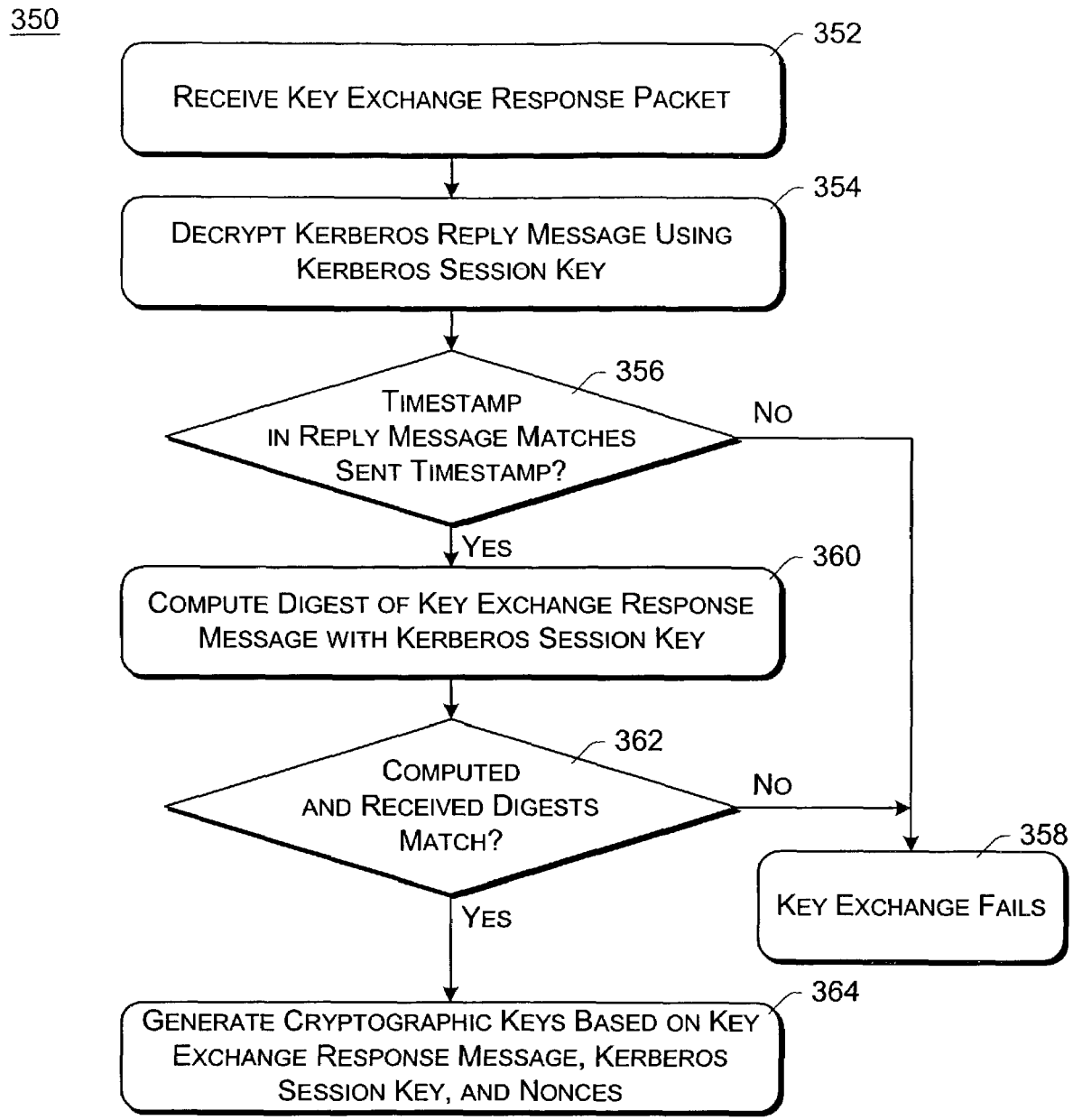
FIG. 6 is a flowchart illustrating an exemplary process for receiving and validating the key exchange response packet, and for generating cryptographic keys

Process 150 is discussed in more detail below with reference to FIGS. 3-6. FIG. 3 illustrates act 152 in additional detail, FIG. 4 illustrates act 154 in additional detail, FIG. 5 illustrates acts 156 and 15-8 in additional detail, and FIG. 6 illustrates acts 160 and 162 in additional detail.

FIG. 3 is a flowchart illustrating an exemplary process 200 for generating and sending a key exchange initiator packet. FIG. 3 illustrates act 152 of FIG. 2 in additional detail. The process of FIG. 3 is implemented by a client device, and may be performed in software, firmware, hardware, or combinations thereof. The process of FIG. 3 is discussed with reference to components of FIG. 1.

Initially, client device 102 generates a key exchange initiator message (act 202). The key exchange initiator message includes a random (or pseudo-random) value generated by client device 102 referred to as NonceInit, and also includes the Diffie-Hellman ($g^X$ mod N) value, where X is also a random (or pseudo-random) number generated by client device 102, and a Security Parameters Index value ($SPI_1$) that will be used to uniquely define this client/server communication channel once the key exchange process is complete, as follows:

InitMess=[NonceInit, $SPI_1$, ($g^X$ mod N)].

Client device 102 then computes a digest of the key exchange initiator message using the Kerberos session key $K_{CA}$ received from key distribution center 104 (act 204). The digest is generated as follows:

HashInitMess=$H_{K_{CA}}$[InitMess].

Alternatively, a generic one way hash (that is not keyed) could also be used in the computation of HashInitMess. The security of the key exchange does not rely on whether this hash is keyed or not.

Client device 102 then generates a Kerberos authenticator (act 206). The Kerberos authenticator includes a timestamp (e.g., the current time of client device 102) and the HashInitMess digest computed in act 204. The timestamp is incremented by client device 102 every time device 102 generates a Kerberos authenticator, thereby allowing server device 106 to better detect replay attacks. Client device 102 encrypts the Kerberos authenticator (act 208) using the Kerberos session key $K_{CA}$, as follows:

$$\text{Auth}_T = E_{K_{CA}}[\text{Time, HashInitMess}].$$

Client device 102 then generates a key exchange initiator packet (act 210). The key exchange initiator packet includes the key exchange initiator message InitMess, the encrypted Kerberos authenticator $\text{Auth}_T$, and the Kerberos ticket for server device 106 received from key distribution center 104. As discussed above, the Kerberos ticket includes at least the Kerberos session key ($K_{CA}$), a range of time during which the ticket is valid, and a unique number that identifies client device 102, all encrypted using a secret key shared by key distribution center 104 and server device 106. The SPI value identifies the security association or communication channel between client device 102 and server device 106. The $SPI_1$ value is associated with communications from server device 106 to client device 102, and an $SPI_2$ value is associated with communications from client device 102 to server device 106. The key exchange initiator packet is thus as follows:

$$\text{InitPacket} = [\text{InitMess, Auth}_T, \text{Ticket}].$$

It should be noted that the combination of the authenticator and the ticket is referred to as the AP Request in Kerberos terminology. Client device 102 then sends the key exchange initiator packet to server device 106 (act 212).

FIG. 4 is a flowchart illustrating an exemplary process 250 for receiving and validating the key exchange initiator packet. FIG. 4 illustrates act 154 of FIG. 2 in additional detail. The process of FIG. 4 is implemented by a server device, and may be performed in software, firmware, hardware, or combinations thereof. The process of FIG. 4 is discussed with reference to components of FIG. 1.

Initially, server device 106 receives the key exchange initiator packet InitPacket (act 252). In one implementation, server device 106 expects all key exchange initiator packets to be in a predetermined format and of a predetermined size. Any key exchange initiator packet not in this predetermined format or of the predetermined size is ignored by server device 106. Alternatively, server device 106 may allow key exchange initiator packets to be in a variety of formats and/or of a variety of sizes.

Once the key exchange initiator packet is received, server device 106 decrypts the Kerberos ticket (act 254), using the key that server device 106 shares with key distribution center 104. Server device 106 then checks the decrypted ticket to determine whether ticket is stale (act 256). If the current time is included in the range of times during which the ticket is valid (as identified in the ticket), then the ticket is not stale. However, if the current time is not included in the range of times during which the ticket is valid, then the ticket is stale. If the Kerberos ticket is stale, then the key exchange process fails (act 258), resulting in no security association being established between client device 102 and server device 106. As part of act 258, server device 106 may notify client device 102 that the key exchange process has failed, or alternatively server device 106 may just delete the received InitPacket and not notify client device 102.

However, if the Kerberos ticket is not stale, then server device 106 decrypts the Kerberos authenticator $\text{Auth}_T$ (act 260), using the Kerberos session key $K_{CA}$ recovered from the decrypted Kerberos ticket. Server device 106 then accesses the timestamp Time in the Kerberos authenticator and checks whether the timestamp is acceptable (act 262). The timestamp is acceptable if it is not too far out of synchronization with the current time on server device 106. In an exemplary implementation, if the timestamp is within a threshold amount of time (e.g., 5 minutes, which is the recommended Kerberos time skew) from the current time on server device 106, then the timestamp is acceptable. If the timestamp is not acceptable, then the key exchange process fails (act 258).

If the timestamp is acceptable, then server device 106 computes the digest of the key exchange message InitMess (act 264). Server device 106 computes the digest in the same manner as client device 102 computed the digest in act 204 of FIG. 3. Server device 106 then checks whether the digest value it computed in act 264 matches (is equal to) the digest value received from client device 102 as part of the encrypted Kerberos authenticator $\text{Auth}_T$ (act 266). If the two digest values are the same then it serves to confirm that the key exchange message InitMess has not been altered between client device 102 and server device 106 (e.g., the key exchange message InitMess has not been tampered with). If the two digest values do not match (in other words, if the two digest values are not equal), then the key exchange process fails (act 258).

However, if the received and computed digest values match, then server device 106 checks whether the Kerberos authenticator has been replayed (act 268). Server device 106 keeps a record of the timestamps from each Kerberos authenticator it receives from each client device C (which is revealed in the Kerberos ticket). If server device 106 receives a Kerberos authenticator with a timestamp Time that is not newer than the last timestamp recorded by server device 106, then server device 106 knows that the Kerberos authenticator has been replayed. If the Kerberos authenticator has been replayed, then the key exchange initiator packet is not valid and the key exchange process fails (act 258). However, if the Kerberos authenticator has not been replayed, then the key exchange initiator packet has been validated by server device 106 (act 270). If all these tests are satisfied and the key exchange initiator packet is validated in act 270, then server device 106 has authenticated client device 102 as really being the device it claims to be—server device 106 has verified that client device 102 has knowledge of the Kerberos session key $K_{CA}$ and has (indirectly through trust of the key distribution center) also verified that the client has knowledge of $K_C$.

FIG. 5 is a flowchart illustrating an exemplary process 300 for generating cryptographic keys, as well as generating and sending a key exchange response packet. FIG. 5 illustrates acts 156 and 158 of FIG. 2 in additional detail. The process of FIG. 5 is implemented by a server device, and may be performed in software, firmware, hardware, or combinations thereof. The process of FIG. 5 is discussed with reference to components of FIG. 1.

Initially, server device 106 generates cryptographic keys based on the key exchange initiator message InitMess, the Kerberos session key $K_{CA}$, the nonce from client device 102 (NonceInit), and a nonce generated by server device 106 (NonceResp) (act 302). Server device 106 generates a random (or pseudo-random) number Y, as well as a random value referred to as NonceResp. Server device 106 further computes the Diffie-Heliman value ($g^{XY}$ mod N) as well as the Diffie-Hellman value ($g^Y$ mod N). At this point, server device 106 has enough data to compute security association keys. The security association keys are used to secure point-to-point communication between two consoles. In an exemplary implementation, server device 106 uses the two Diffie-Hellman values (($g^X$ mod N) and (Y)) to compute the function ($g^{XY}$ mod N). Server device 106 can then compute various digests using various algorithms based on the values NonceInit, NonceResp, ($g^{XY}$ mod N), and the Kerberos session key $K_{CA}$. These digests are then used to form the security association keys. In one exemplary implementation, server device 106 computes four different digests using NonceInit, NonceResp, and ($g^{XY}$ mod N) as input, as well as the Kerberos session key $K_{CA}$, to be used as the security keys for authenticating and encrypting/decrypting all secure packets in both directions (one key for authentication, one key for encryption, times two for each direction totals four).

Server device 106 then generates a key exchange response message (act 304). The key exchange response message contains NonceInit, the timestamp Time received from client device 102, NonceResp, the Diffie-Hellman value ($g^Y$ mod N), and an $SPI_2$ value as follows:

RespMess=[NonceInit, $SPI_2$, NonceResp, ($g^Y$ mod N)].

The $SPI_2$ value is generated by server device 106 and is associated with all communications from client device 102 to server device 106. Server device 106 then computes a digest of the response message using the Kerberos session key (act 306) and a hash function H, as follows:

HashRespMess=$H_{K_{CA}}$[RespMess].

The hash function H in act 306 may be the same as the hash function H in act 204, or alternatively a different hash function.

Server device 106 then generates a Kerberos reply message including both the computed hash digest and the timestamp Time from the Kerberos authenticator (act 308), as follows:

ReplyMess=[HashRespMess, Time].

Server device 106 then encrypts the Kerberos reply message ReplyMess using an encryption algorithm E (e.g., Triple DES) and the Kerberos session key $K_{CA}$ (act 310), as follows:

EncryptedReplyMess=$E_{K_{CA}}$[ReplyMess].

The encryption algorithm E in act 308 may be the same encryption algorithm as used in act 206 of FIG. 3, or alternatively a different encryption algorithm.

Server device 106 then generates a key exchange response packet that includes the key exchange response message RespMess, and the encrypted Kerberos reply message EncryptedReplyMess, as follows:

RespPacket=[RespMess, EncryptedReplyMess].

Server device 106 then sends the key exchange response packet RespPacket to client device 102 (act 314).

FIG. 6 is a flowchart illustrating an exemplary process 350 for receiving and validating the key exchange response packet, and for generating cryptographic keys. FIG. 6 illustrates acts 160 and 162 of FIG. 2 in additional detail. The process of FIG. 6 is implemented by a client device, and may be performed in software, firmware, hardware, or combinations thereof. The process of FIG. 6 is discussed with reference to components of FIG. 1.

Initially, client device 102 receives the key exchange response packet RespPacket from server device 106 (act 352). Client device 102 decrypts the Kerberos reply message EncryptedReplyMess using the Kerberos session key $K_{CA}$ (act 354). Client device 102 then checks whether the timestamp Time in the decrypted reply message matches the timestamp Time that client device 102 sent to server device 106 (act 356). If the timestamps match (in other words, if the timestamps are equal), then the matching confirms that server device 106 was able to decrypt the Kerberos ticket (thus proving knowledge of $K_A$) and the Kerberos authenticator (and thus has knowledge of the Kerberos session key $K_{CA}$), and therefore really is the server device 106 that it claims to be. Server device 106 is thus authenticated to client device 102 if these timestamp values match, and at this point, full mutual authentication has been achieved (the server has proven to the client knowledge of $K_A$, and the client has proven to the server knowledge of $K_C$).

If the timestamp values do not match, then the key exchange process fails (act 358), analogous to act 258 of FIG. 4. However, if the timestamp values do match, then server device 106 is authenticated to client device 102 and client device 102 proceeds to compute the digest of the key exchange response message RespMess using the Kerberos session key $K_{CA}$ (act 360). Client device 102 computes the digest in the same manner as server device 106 computed the digest in act 306 of FIG. 5. Client device 102 then checks whether the digest value it computed in act 360 matches (is equal to) the digest value received from server device 106 as part of the encrypted Kerberos reply message EncryptedReplyMess (act 362). If the two digest values are the same then it serves to confirm that the key exchange response message RespMess has not been altered between server device 106 and client device 102 (e.g., the key exchange response message RespMess has not been tampered with). If the two digest values do not match (in other words, if the two digest values are not equal), then the key exchange process fails (act 358).

However, if the two digest values do match, then client device 102 generates the cryptographic keys based on the Kerberos session key $K_{CA}$, NonceInit, NonceResp, and $g^{XY}$ mod N (act 364). Analogous to the discussion above regarding act 302 of FIG. 5, client device 102 now has enough data to calculate the Diffie-Hellman value ($g^{XY}$ mod N), and to compute the security association keys. The security association keys computed in act 364 by client device 102 are the same as, and are calculated in the same manner as, those calculated by server device 104 in act 302 of FIG. 5. Note that $g^{XY}$ mod N is computed from $g^Y$ mod N and X on the client device.

Once client device 102 has the security association keys, device 102 is free to transmit any packets that have been waiting for key exchange to complete. Server device 104, however, is not free to do so even though it has the same set of keys because it cannot be sure that its response message RespMess was not lost. Server device 104 waits until it receives a packet authenticated with the computed security association key from client device 102, or optionally until it receives an Acknowledge packet (AckPack) from client device 102.

In the common case, client device 102 sends a packet to server device 106 and thus, the key exchange process consists of just two packets—InitPacket and RespPacket. Alternatively, should client device 102 not have a packet to send, client device 102 will send an artificial acknowledge packet (denoted as "AckPack"). This packet differs from the two other key exchange packets in that the AckPack is hashed using the computed security association key instead of the Kerberos session key $K_{C4}$.

From this point forward, the two devices 102 and 104 use the security association keys to secure communications. All network packets that need to be transmitted to the other device are authenticated after optionally being encrypted, with the receiving device verifying the authentication data before decrypting the packet contents. Any of device 102 and 104 can disregard key-exchange packets from the other side containing the same Nonces.

Figure 7:
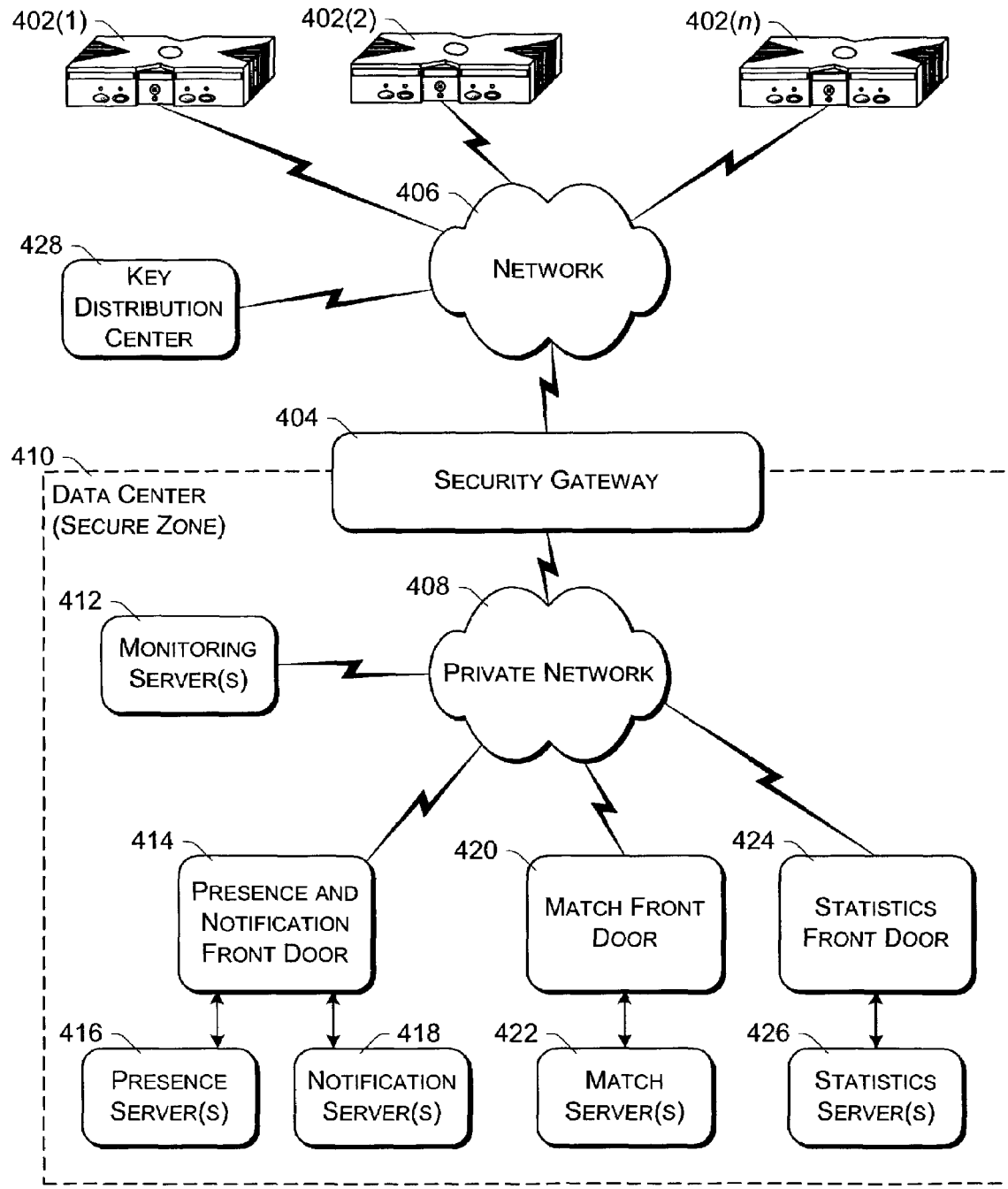
FIG. 7 is a block diagram of an exemplary online gaming environment in which the secure key exchange with mutual authentication can be used.

FIG. 7 is a block diagram of an exemplary online gaming environment 400. Multiple game consoles 402(1), 402(2), ..., 402(n) are coupled to a security gateway 404 via a network 406. Network 406 represents any one or more of a variety of conventional data communications networks. Network 406 will typically include packet switched networks, but may also include circuit switched networks. Network 406 can include wire and/or wireless portions. In one exemplary implementation, network 406 includes the Internet and may optionally include one or more local area networks (LANs) and/or wide area networks (WANs). At least a part of network 406 is a public network, which refers to a network that is publicly-accessible. Virtually anyone can access the public network.

In some situations, network 406 includes a LAN (e.g., a home network), with a routing device situated between game console 402 and security gateway 404. This routing device may perform network address translation (NAT), allowing the multiple devices on the LAN to share the same IP address on the Internet, and also operating as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices communicating via trusted communications. Thus, encryption and authentication within secure zone 410 is not necessary. The private nature of network 408 refers to the restricted accessibility of network 408—access to network 408 is restricted to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412; one or more presence and notification front doors 414, one or more presence servers 416, and one or more notification servers 418 (collectively implementing a presence and notification service); one or more match front doors 420 and one or more match servers 422 (collectively implementing a match service); and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 7, alternatively multiple data centers may exist with which game consoles 402 can communicate. These data centers may operate independently, or alternatively may operate collectively (e.g., to make one large data center available to game consoles 102).

Game consoles 402 are situated remotely from data center 410, and access data center 410 via network 406. A game console 402 desiring to communicate with one or more devices in the data center establishes a secure communication channel between the console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402 can have data embedded therein. This embedded data is referred to as the content or data content of the packet. Additional information may also be inherently included in the packet based on the packet type.

The secure communication channel between a console 402 and security gateway 404 is established using the secure key exchange with mutual authentication described herein. Console 402 authenticates itself and the current user(s) of console 402 to a key distribution center 428 and obtains, from key distribution center 428, a security ticket. Console 402 then uses this security ticket to establish the secure communication channel with security gateway 404. In establishing the secure communication channel with security gateway 404, the game console 402 and security gateway 404 authenticate themselves to one another and establish one or more session security keys that are known only to that particular game console 402 and the security gateway 404. This session security key(s) is used to encrypt data transferred between the game console 402 and the security gateway cluster 404, so no other devices (including other game consoles 402) can read the data. The session security key(s) is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It should be noted that, even if a data packet is unencrypted or only partially encrypted, all of the data packet is still authenticated.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this may be explicit, such as each security gateway device maintaining a table of game consoles handled by the other security gateway devices, or alternatively implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 104 detects that a game console is no longer available, security gateway 104 sends a message to monitoring server 112 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 hold and process data concerning the status or presence of a given user logged in to data center 410 for online gaming. Notification server(s) 418 maintains multiple queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414. Security gateway 404 communicates messages for servers 416 and 418 to the front door 414, and the front door 414 identifies which particular server 416 or particular server 418 the message is to be communicated to. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 hold and process data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 hold and process data concerning various statistics for online games. The specific statistics used can vary based on the game designer's desires (e.g., the top ten scores or times, a world ranking for all online players of the game, a list of users who have found the most items or spent the most time playing, etc.). Statistics front door 426 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted, public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

Figure 8:
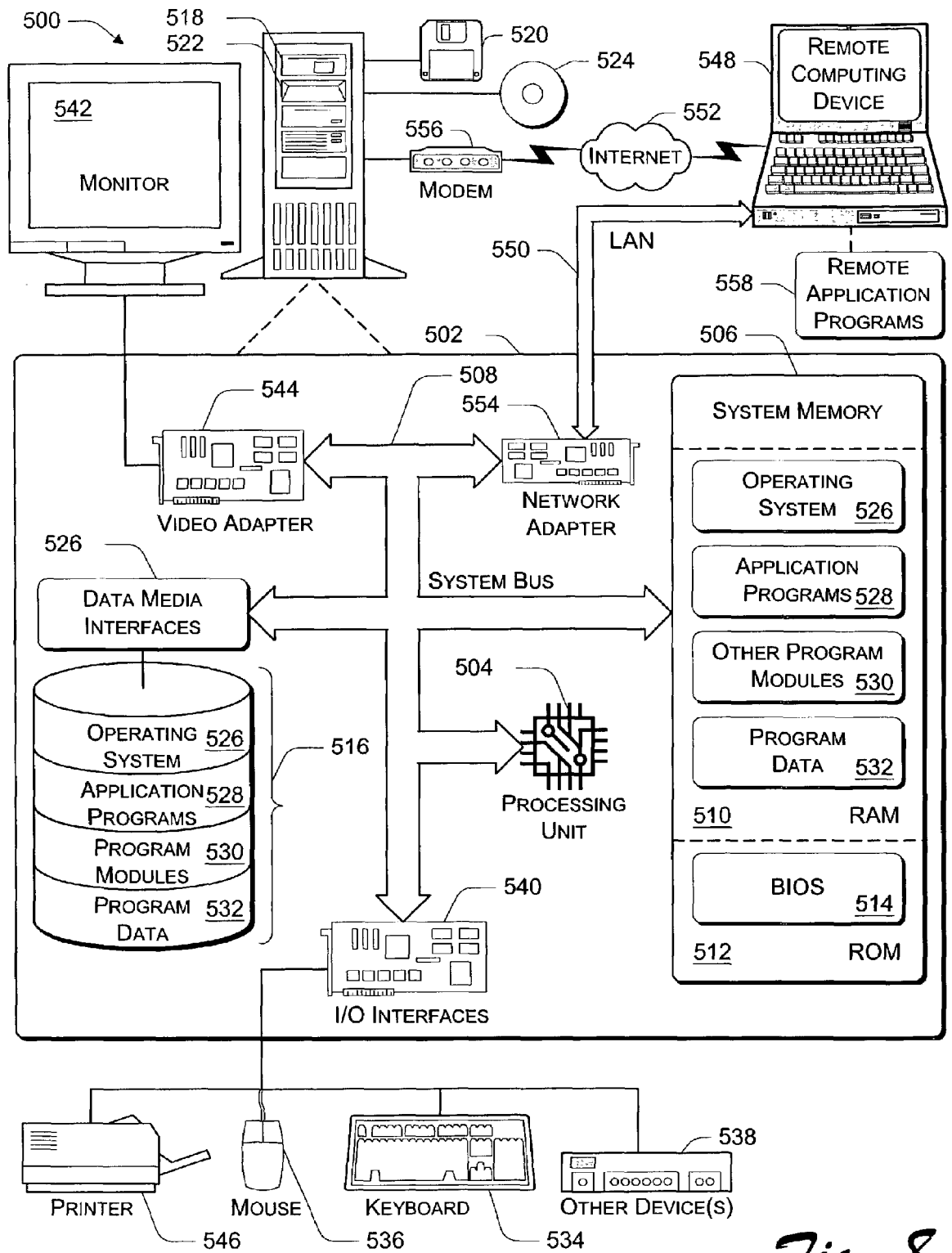
FIG. 8 illustrates a general computer environment, which can be used to implement the techniques described herein.

FIG. 8 illustrates a general computer environment 800, which can be used to implement the techniques described herein. The computer environment 800 is only one example of a computing environment and is not intended to suggest any limitation as to the scope of use or functionality of the computer and network architectures. Neither should the computer environment 800 be interpreted as having any dependency or requirement relating to any one or combination of components illustrated in the exemplary computer environment 800.

Computer environment 800 includes a general-purpose computing device in the form of a computer 802. Computer 802 can be, for example, a client device 102, server device 106, and/or device that is part of key distribution center 104 of FIG. 1; a security gateway device 404, a server 412, 416, 418, 422, and/or 426 of FIG. 1, and/or a front door 414, 420, or 424 of FIG. 7. The components of computer 802 can include, but are not limited to, one or more processors or processing units 804, a system memory 806, and a system bus 808 that couples various system components including the processor 804 to the system memory 806. Computer 802 may also include a cryptographic processor(s) or coprocessor(s) (not shown in FIG. 8). Such a cryptographic processor(s) or coprocessor(s) is designed to perform cryptographic operations (such as encryption, decryption, and hashing) and alleviate other processor(s) (e.g., processing unit(s) 804) from computationally-expensive cryptographic operations.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 802 typically includes a variety of computer readable media. Such media can be any available media that is accessible by computer 802 and includes both volatile and non-volatile media, removable and non-removable media.

The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 may also include other removable/non-removable, volatile/non-volatile computer storage media. By way of example, FIG. 7 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by one or more interfaces (not shown).

The disk drives and their associated computer-readable media provide nonvolatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof may implement all or part of the resident components that support the distributed file system.

A user can enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, game console, and the like. The remote computing device 848 is illustrated as a portable computer that can include many or all of the elements and features described herein relative to computer 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet.

When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components such as the operating system are illustrated herein as discrete blocks, although it is recognized that such programs and components reside at various times in different storage components of the computing device 802, and are executed by the data processor(s) of the computer.

Figure 9:
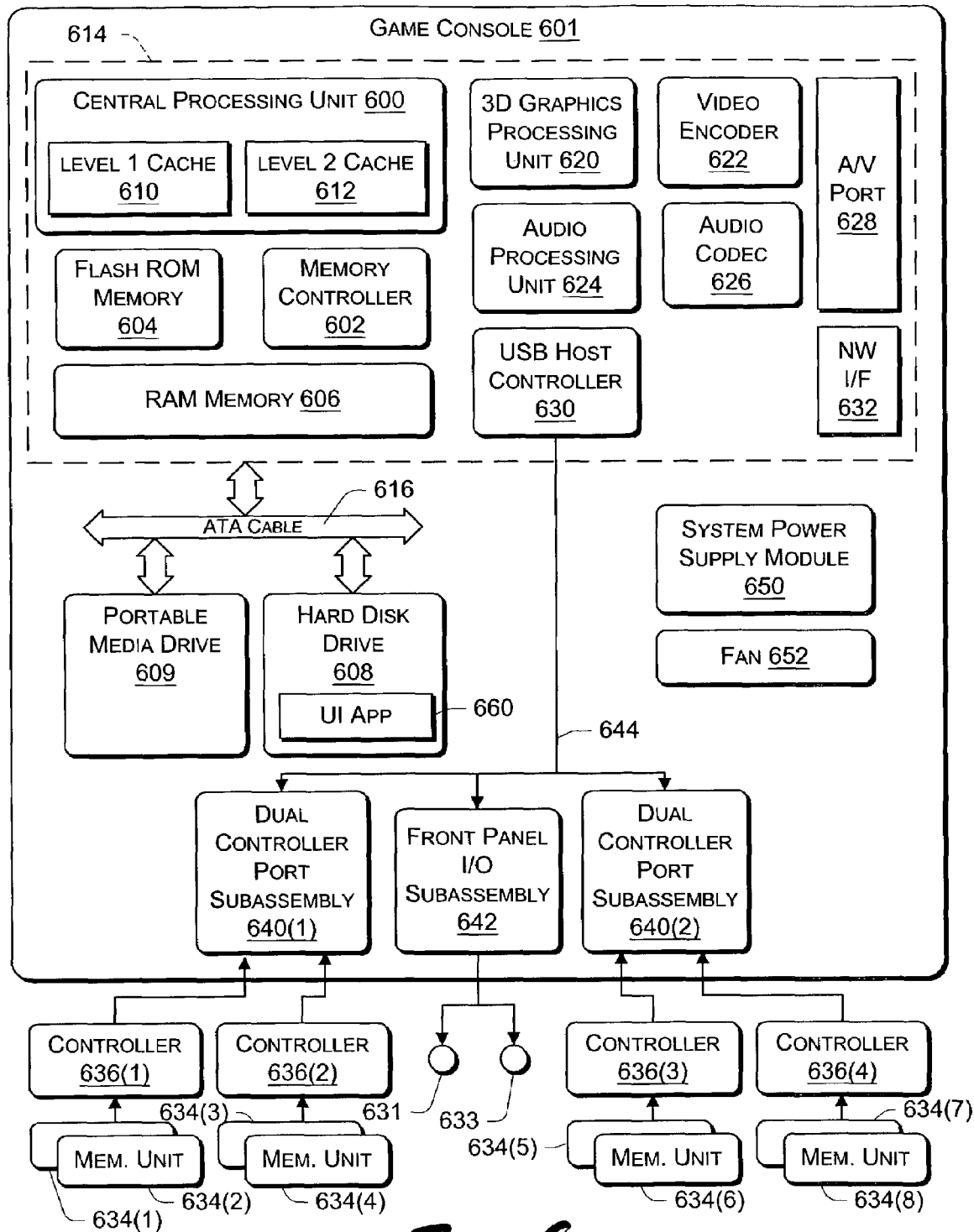
FIG. 9 shows functional components of a game console in more detail, which can be used to implement the techniques described herein.

FIG. 9 shows functional components of a game console 601 in more detail. Game console 601 may be, for example, a client device 102 of FIG. 1. Game console 601 has a central processing unit (CPU) 600 and a memory controller 602 that facilitates processor access to various types of memory, including a flash ROM (Read Only Memory) 604, a RAM (Random Access Memory) 606, a hard disk drive 608, and a portable media drive 609. CPU 600 is equipped with a level 1 cache 610 and a level 2 cache 612 to temporarily store data and hence reduce the number of memory access cycles, thereby improving processing speed and throughput.

CPU 600, memory controller 602, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

As one suitable implementation, CPU 600, memory controller 602, ROM 604, and RAM 606 are integrated onto a common module 614. In this implementation, ROM 604 is configured as a flash ROM that is connected to the memory controller 602 via a PCI (Peripheral Component Interconnect) bus and a ROM bus (neither of which are shown). RAM 606 is configured as multiple DDR SDRAM (Double Data Rate Synchronous Dynamic RAM) that are independently controlled by the memory controller 602 via separate buses (not shown). The hard disk drive 608 and portable media drive 609 are connected to the memory controller via the PCI bus and an ATA (AT Attachment) bus 616.

A 3D graphics processing unit 620 and a video encoder 622 form a video processing pipeline for high speed and high resolution graphics processing. Data is carried from the graphics processing unit 620 to the video encoder 622 via a digital video bus (not shown). An audio processing unit 624 and an audio codec (coder/decoder) 626 form a corresponding audio processing pipeline with high fidelity and stereo processing. Audio data is carried between the audio processing unit 624 and the audio codec 626 via a communication link (not shown). The video and audio processing pipelines output data to an A/V (audio/video) port 628 for transmission to the television or other display. In the illustrated implementation, the video and audio processing components 620-628 are mounted on the module 614.

Also implemented on the module 614 are a USB host controller 630 and a network interface 632. The USB host controller 630 is coupled to the CPU 600 and the memory controller 602 via a bus (e.g., PCI bus) and serves as host for the peripheral controllers 636(1)-636(4). The network interface 632 provides access to a network (e.g., Internet, home network, etc.) and may be any of a wide variety of various wire or wireless interface components including an Ethernet card, a modem, a Bluetooth module, a cable modem, and the like.

The game console 601 has two dual controller support subassemblies 640(1) and 640(2), with each subassembly supporting two game controllers 636(1)-636(4). A front panel I/O subassembly 642 supports the functionality of a power button 631 and a media drive eject button 633, as well as any LEDs (light emitting diodes) or other indicators exposed on the outer surface of the game console. The subassemblies 640(1), 640(2), and 642 are coupled to the module 614 via one or more cable assemblies 644.

Eight memory units 634(1)-634(8) are illustrated as being connectable to the four controllers 636(1)-636(4), i.e., two memory units for each controller. Each memory unit 634 offers additional storage on which games, game parameters, and other data may be stored. When inserted into a controller, the memory unit 634 can be accessed by the memory controller 602.

A system power supply module 650 provides power to the components of the game console 601. A fan 652 cools the circuitry within the game console 601.

A console user interface (UI) application 660 is stored on the hard disk drive 608. When the game console is powered on, various portions of the console application 660 are loaded into RAM 606 and/or caches 610, 612 and executed on the CPU 600. Console application 660 presents a graphical user interface that provides a consistent user experience when navigating to different media types available on the game console.

Game console 601 implements a cryptography engine to perform common cryptographic functions, such as encryption, decryption, authentication, digital signing, hashing, and the like. The cryptography engine may be implemented as part of the CPU 600, or in software stored on the hard disk drive 608 that executes on the CPU, so that the CPU is configured to perform the cryptographic functions. Alternatively, a cryptographic processor or co-processor designed to perform the cryptographic functions may be included in game console 601.

Game console 601 may be operated as a standalone system by simply connecting the system to a television or other display. In this standalone mode, game console 601 allows one or more players to play games, watch movies, or listen to music. However, with the integration of broadband connectivity made available through the network interface 632, game console 601 may further be operated as a participant in online gaming, as discussed above.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The secure key exchange with mutual authentication discussed herein is discussed with reference to the Diffie-Hellman exponentiation operations to derive a secret. Alternatively, other cryptographic operations or methods may be used in place of Diffie-Hellman.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable storage media having stored thereon a plurality of instructions that, when executed by one or more processors of a first device, causes the one or more processors to:
    perform, in a single roundtrip between the first device and a second device over a network, a key exchange with the second device on the network achieving both mutual authentication with the second device and perfect forward secrecy, wherein the mutual authentication and perfect forward secrecy are achieved without requiring any additional communication with other devices on the network during the single roundtrip.

2. One or more computer readable storage media as recited in claim 1, wherein the perfect forward secrecy is achieved based on Diffie-Hellman values included in the single roundtrip over the network.

3. One or more computer readable storage media as recited in claim 1, wherein the single roundtrip over the network includes a key exchange initiator message, and wherein the instructions, when executed by the one or more processors, cause the one or more processors to verify a digest of the key exchange initiator message to verify that the key exchange initiator message has not been tampered with.

4. One or more computer readable storage media as recited in claim 3, wherein the instructions, when executed by the one or more processors, further cause the one or more processors to generate the digest of the key exchange initiator message using a keyed hash.

5. One or more computer readable storage media as recited in claim 1, wherein the single roundtrip over the network includes a key exchange response message, and wherein the instructions, when executed by the one or more processors, cause the one or more processors to verify a digest of the key exchange response message to verify that the key exchange response message has not been tampered with.

6. One or more computer readable storage media as recited in claim 5, wherein the instructions, when executed by the one or more processors, further cause the one or more processors to generate the digest of the key exchange response message using a keyed hash.

7. One or more computer readable storage media as recited in claim 1, wherein the single roundtrip over the network includes a key exchange initiator message, and wherein the instructions, when executed by the one or more processors, cause the one or more processors to check whether a timestamp included in the key exchange initiator message is within a threshold amount of time of the current time, and respond to the key exchange initiator message only if the timestamp is within the threshold amount of time of the current time.

8. One or more computer readable storage media as recited in claim 1, wherein the single roundtrip over the network includes a key exchange initiator message, and wherein the instructions, when executed by the one or more processors, cause the one or more processors to check whether a timestamp included in the key exchange initiator message is newer than a last timestamp received from the device, and respond to the key exchange initiator message only if the timestamp is newer than the last timestamp received from the second device.

9. One or more computer readable storage media as recited in claim 1, wherein the network comprises the Internet.

10. One or more computer readable storage media as recited in claim 1, wherein the one or more processors are implemented in a game console.

11. One or more computer readable storage media as recited in claim 1, wherein the plurality of instructions further causes the one or more processors to:
    send, to the second device, a key exchange initiator packet that does not include the key;
    receive, from the second device, a key exchange response packet that does not include the key;
    validate the key exchange response packet; and
    generate, based at least in part on data in the key exchange response packet, the key without requiring any additional packets to be sent to the second device or received from the second device in order to generate the key.

12. One or more computer readable storage media as recited in claim 1, wherein the plurality of instructions further causes the one or more processors to:
    receive, from the second device, a key exchange initiator packet that does not include the key;
    validate the key exchange initiator packet;
    generate, based at least in part on data in the key exchange initiator packet, the key without requiring any additional packets to be received from the second device in order to generate the key; and
    send, to the second device, a key exchange response packet that does not include the key.

13. One or more computer readable storage media as recited in claim 1, wherein the mutual authentication is achieved based on a Kerberos authentication protocol.

14. A method, implemented in a game console, of establishing a mutual key for use in communications with a device, the method comprising:
    generating a key exchange initiator packet by:
        generating a key exchange initiator message;
        computing a digest of the key exchange initiator message;
        generating, based at least in part on the digest, an authenticator;

encrypting the authenticator; and
generating the key exchange initiator packet that includes the key exchange initiator message, the encrypted authenticator, and a security ticket;
sending, to the device via a network, the key exchange initiator packet that does not include the mutual key;
receiving, from the device via the network, a key exchange response packet that does not include the mutual key;
validating the key exchange response packet; and
generating, based at least in part on data in the key exchange response packet, the mutual key without requiring any additional packets to be sent to the device or received from the device in order to generate the mutual key and without requiring any additional packets to be sent to other devices via the network, wherein generating the mutual key comprises:
retrieving a first value from the key exchange initiator packet;
generating a random second value;
calculating a third value using the first value and the second value; and
generating the mutual key based at least in part on the third value.

15. A method as recited in claim 14, wherein the key exchange initiator packet allows the device that sends the key exchange response packet to generate the same mutual key without requiring any additional packets to be sent to the device in order to generate the key.

16. A method as recited in claim 14, wherein the first value comprises a Diffie-Hellman value ($g^Y \bmod N$), the second value comprises a certain value (X) and the third value comprises a Diffie-Hellman value ($g^{XY} \bmod N$).

17. A method as recited in claim 14, wherein the key exchange initiator packet and the key exchange response packet allow perfect forward secrecy to be achieved.

18. A method as recited in claim 14, wherein validating the key exchange response packet comprises:
decrypting a reply message included in the key exchange response packet;
checking whether a timestamp in the reply message is the same as a timestamp previously sent to the device;
computing a digest value of a key exchange response message included in the key exchange response packet; and
determining that the key exchange response packet is valid only if the timestamp in the reply message is the same as the timestamp previously sent to the device, and if the computed digest value of the key exchange response packet is the same as a digest value included in the key exchange response packet.

19. A method of establishing a key for use in communications with a game console, the method comprising:
receiving, from the game console via a network, a key exchange initiator packet that does not include the key;
validating the key exchange initiator packet, wherein validating the key exchange initiator packet comprises:
decrypting a security ticket in the key exchange initiator packet;
decrypting an authenticator in the key exchange initiator packet;
computing a digest of a key exchange message in the key exchange initiator packet; and
determining that the key exchange initiator packet is valid only if all of the following conditions are satisfied:
the security ticket is not stale,
a timestamp in the authenticator is acceptable,
the computed digest of the key exchange message is equal to a digest value included as part of the authenticator, and
the authenticator has not been replayed;
generating, based at least in part on data in the key exchange initiator packet, the key without requiring any additional packets to be received from the game console in order to generate the key and without requiring any additional packets to be sent to other devices via the network, wherein generating the key comprises:
retrieving, from the key exchange initiator packet, a first value;
generating a random second value;
calculating a third value using the first value and the second value; and
generating the key based at least in part on the third value; and
sending, to the game console via the network, a key exchange response packet that does not include the key.

20. A method as recited in claim 19, wherein the key exchange response packet includes information that allows the game console to generate the key without requiring any additional packets to be sent to the game console in order to generate the key.

21. A method as recited in claim 19, wherein the first value comprises a Diffie-Hellman value ($g^X \bmod N$), the second value comprises a certain value (Y) and the third value comprises a Diffie-Hellman value ($g^{XY} \bmod N$).

22. A method as recited in claim 19, wherein the key exchange initiator packet and the key exchange response packet allow perfect forward secrecy to be achieved.

23. A method as recited in claim 19, further comprising generating the key exchange response packet by:
generating a key exchange response message;
computing a digest of the key exchange response message;
generating a reply message;
encrypting the reply message; and
generating a key exchange response packet including both the key exchange response message and the encrypted reply message.

24. A method, implemented in a game console to initiate establishing a key to be used in subsequent secure communications between the game console and a server device, the method comprising:
generating a key exchange initiator message, wherein generating the key exchange initiator message comprises:
generating a first value and a second value;
using the second value to generate a third value; and
including, in the key initiator message, the first value and the third value;
computing a digest of the key exchange initiator message;
generating, based at least in part on the digest, an authenticator;
encrypting the authenticator;
generating a key exchange initiator packet that includes the key exchange initiator message, the encrypted authenticator, and a security ticket, wherein the key exchange initiator packet allows perfect forward secrecy to be achieved; and
sending the key exchange initiator packet to the server device to be used by the server device to authenticate the game console in the absence of other devices.

25. A method as recited in claim 24, wherein the first value comprises a NonceInit value, the second value comprises a certain value X, and the third value comprises a Diffie-Hellman value ($g^X \bmod N$).

26. A method as recited in claim 24, wherein computing the digest of the key exchange initiator message comprises:
using a Kerberos session key $K_{CA}$, previously received from a key distribution center, and a hashing function to compute the digest.

27. A method as recited in claim 24, wherein encrypting the authenticator comprises encrypting the authenticator based at least in part on a Kerberos session key $K_{CA}$, previously received from a key distribution center.

28. A method as recited in claim 24, wherein generating the key exchange initiator packet comprises including, in the key exchange initiator packet, the following:
the key exchange initiator message;
a predetermined Security Parameters Index (SPI) value to indicate that establishment of a new security association is being initiated;
the encrypted authenticator; and
the security ticket.

29. A method as recited in claim 24, wherein the security ticket comprises a Kerberos ticket.

30. A method, implemented in a game console to initiate establishing a key to be used in subsequent secure communications between the game console and a server device, the method comprising:
generating a key exchange initiator message;
computing a digest of the key exchange initiator message;
generating, based at least in part on the digest, an authenticator, wherein generating the authenticator comprises:
generating a current timestamp; and
including, in the authenticator, the current timestamp and the digest of the key exchange initiator message;
encrypting the authenticator;
generating a key exchange initiator packet that includes the key exchange initiator message, the encrypted authenticator, and a security ticket, wherein the key exchange initiator packet allows perfect forward secrecy to be achieved; and
sending the key exchange initiator packet to the server device to be used by the server device to authenticate the game console in the absence of other devices.

31. A method as recited in claim 30, wherein generating the key exchange initiator message comprises:
generating a first value and a second value;
using the second value to generate a third value; and
including, in the key initiator message, the first value and the third value.

32. A method, implemented in a server device establishing a key to be used in subsequent secure communications between the server device and a game console, the method comprising:
receiving, from the game console, a key exchange initiator packet, wherein the key exchange initiator packet allows perfect forward secrecy to be achieved;
decrypting a security ticket in the key exchange initiator packet;
decrypting an authenticator in the key exchange initiator packet;
computing a digest of a key exchange message in the key exchange initiator packet; and
determining, without accessing other devices, that the key exchange initiator packet is valid only if all of the following conditions are satisfied:
the security ticket is not stale,
a timestamp in the authenticator is acceptable,
the computed digest of the key exchange message is equal to a digest value included as part of the authenticator, and
the authenticator has not been replayed.

33. A method as recited in claim 32, wherein decrypting the security ticket comprises:
decrypting the security ticket using a key shared by the server device and a key distribution center that gave the security ticket to the game console.

34. A method as recited in claim 32, further comprising determining the security ticket is stale if a current time is not included in a range of times identified in the security ticket.

35. A method as recited in claim 32, further comprising determining the timestamp in the authenticator is acceptable if the timestamp is within a threshold amount of time of a current time.

36. A method as recited in claim 32, further comprising determining that the authenticator has been replayed if the timestamp is not newer than a last timestamp received by the server device from the game console.

37. A method as recited in claim 32, further comprising:
retrieving, from the key exchange initiator packet, a Diffie-Hellman value ($g^X$ mod N);
generating a random value (Y);
sending a Diffie-Hellman value ($g^Y$ mod N) in a response to the key exchange initiator packet;
calculating a Diffie-Hellman value ($g^{XY}$ mod N); and
generating the key based at least in part on the Diffie-Hellman value ($g^{XY}$ mod N).

38. A method as recited in claim 32, further comprising:
retrieving, from the key exchange initiator packet, a first value;
generating a random second value;
sending a third value associated with the first value and the second value in a response to the key exchange initiator packet;
calculating a fourth value using the first value and the second value; and
generating the key based at least in part on the fourth value.

39. One or more computer readable storage media having stored thereon a plurality of instructions that, when executed by one or more processors of a server device in establishing a key to be used in subsequent secure communications between the server device and a game console, causes the one or more processors to:
receive a key exchange initiator packet as part of a single roundtrip between the server device and the game console, wherein the key exchange initiator packet allows perfect forward secrecy to be achieved;
decrypt a security ticket in the key exchange initiator packet;
check, without requiring any additional communication with other devices, whether a current time is within a range of times identified in the security ticket, and indicate the key cannot be established if the current time is not within the range of times identified in the security ticket;
decrypt an authenticator in the key exchange initiator packet;
check, without requiring any additional communication with other devices, whether a timestamp in the authenticator is within a threshold amount of time of the current time, and indicate the key cannot be established if the timestamp is not within the threshold amount of time of the current time;
compute a digest value of a key exchange message in the key exchange initiator packet; and
check, without requiring any additional communication with other devices, whether the computed digest value is equal to a digest value included as part of the authenticator, and indicate that the key cannot be established if the computed digest value is not equal to the digest value included as part of the authenticator.

40. One or more computer readable storage media as recited in claim 39, wherein the instructions further cause the one or more processors to:
check whether the timestamp is newer than a last timestamp received by the server device from the game console, and indicate that the key cannot be established if the timestamp is not newer than the last timestamp.

41. One or more computer readable storage media as recited in claim 39, wherein the instructions further cause the one or more processors to:
retrieve, from the key exchange initiator packet, a Diffie-Hellman value ($g^X \mod N$);
generate a random value (Y);
send a Diffie-Hellman value ($g^Y \mod N$) as part of a response to the key exchange initiator packet;
calculate a Diffie-Hellman value ($g^{XY} \mod N$); and
generate the key based at least in part on the Diffie-Hellman value ($g^{XY} \mod N$).

42. One or more computer readable storage media as recited in claim 39, wherein the instructions further cause the one or more processors to:
retrieve, from the key exchange initiator packet, a first value;
generate a random second value;
send a third value associated with the first value and the second value as part of a response to the key exchange initiator packet;
calculate a fourth value using the first value and the second value; and
generate the key based at least in part on the fourth value.

43. A method, implemented in a server device establishing a key to be used in subsequent secure communications between the server device and a game console, the method comprising:
generating a key exchange response message;
computing a digest of the key exchange response message;
generating a reply message;
encrypting the reply message;
generating, without requiring any additional communication with other devices, a key exchange response packet including both the key exchange response message and the encrypted reply message; and
sending the key exchange response packet to the game console as part of a single roundtrip between the server device and the game console, wherein the key exchange response packet allows perfect forward secrecy to be achieved.

44. A method as recited in claim 43, wherein generating the key exchange response message comprises:
generating a first value NonceResp;
generating a second value Y;
using the second value Y to generate a Diffie-Hellman value ($g^Y \mod N$); and
including, in the key exchange response message, the following:
a NonceInit value previously received from the game console,
the first value NonceResp,
the Diffie-Hellman value ($g^Y \mod N$), and
a timestamp value previously received from the game console.

45. A method as recited in claim 43, wherein computing the digest of the key exchange response message comprises:

using a Kerberos session key $K_{CA}$, previously received from the game console as part of a Kerberos ticket, and a hashing function to compute the digest.

46. A method as recited in claim 43, wherein generating the reply message comprises including, in the reply message, both a timestamp previously received from the game console and the digest of the key exchange response message.

47. A method as recited in claim 43, wherein encrypting the reply message comprises encrypting the reply message based at least in part on a Kerberos session key $K_{CA}$, previously received from the game console as part of a Kerberos ticket.

48. A method as recited in claim 43, wherein generating the key exchange response packet comprises including, in the key exchange response packet, the following:
the key exchange response message;
the encrypted reply message; and
a Security Parameters Index (SPI) value used to identify the subsequent secure communications from the server device to the game console.

49. A method as recited in claim 43, wherein generating the key exchange response message comprises:
generating a first value;
generating a second value;
using the second value Y to generate a third value; and
including, in the key exchange response message, the following:
the first value,
the third value, and
one or more additional values previously received from the game console.

50. One or more computer readable storage media having stored thereon a plurality of instructions that, when executed by one or more processors in establishing a key to be used in subsequent secure communications between the server device and a game console, causes the one or more processors to:
generate a key exchange response message;
compute a digest of the key exchange response message;
generate a reply message that includes the digest and a timestamp previously received from the game console;
encrypt the reply message;
generate, without requiring any additional communication with other devices, a key exchange response packet including both the key exchange response message and the encrypted reply message; and
send the key exchange response packet to the game console as part of a single roundtrip between the server device and the game console.

51. One or more computer readable storage media as recited in claim 50, wherein the instructions that cause the one or more processors to compute the digest of the key exchange response message include instructions that cause the one or more processors to compute, based at least in part on a Kerberos session key, the digest of the key exchange response message.

52. One or more computer readable storage media as recited in claim 50, wherein the instructions that cause the one or more processors to generate the key exchange response message comprise instructions that cause the one or more processors to:
generate a first value NonceResp;
generate a second value Y;
use the second value Y to generate a Diffie-Hellman value ($g^Y \mod N$); and include, in the key exchange response message, the following:
- a NonceInit value previously received from the game console,
- the first value NonceResp,
- the Diffie-Hellman value ($g^Y \mod N$), and
- the timestamp value.

53. One or more computer readable storage media as recited in claim 50, wherein the instructions that cause the one or more processors to encrypt the reply message comprise instructions that cause the one or more processors to encrypt the reply message based at least in part on the Kerberos session key.

54. One or more computer readable storage media as recited in claim 50, wherein the instructions that cause the one or more processors to generate the key exchange response packet comprise instructions that cause the one or more processors to include, in the key exchange response packet, the following:
- the key exchange response message;
- the encrypted reply message; and
- a Security Parameters Index (SPI) value used to identify the subsequent secure communications from the server device to the game console.

55. One or more computer readable storage media as recited in claim 50, wherein the key exchange response packet allows perfect forward secrecy to be achieved.

56. One or more computer readable storage media as recited in claim 50, wherein the instructions that cause the one or more processors to generate the key exchange response message comprise instructions that cause the one or more processors to:
- generate a first value;
- generate a second value;
- use the second value Y to generate a third value; and
- include, in the key exchange response message, the following:
  - a fourth value previously received from the game console,
  - the first value,
  - the third value, and
  - the timestamp value.

57. A system comprising:
- a client device configured to obtain a session key from a key distribution center; and
- a server device, coupled to the client device via a network, configured to communicate with the client device and, in a single roundtrip over the network without requiring any additional communication with other devices on the network, securely exchange a key and mutually authenticate one another as well as achieve perfect forward secrecy.

58. A system as recited in claim 57, wherein the client device comprises a game console.

59. A system as recited in claim 57, wherein the server device comprises a data center security gateway.

60. A system as recited in claim 57, wherein the server device is further configured to:
- receive, from the client device, the key exchange initiator packet that does not include the key;
- validate the key exchange initiator packet;
- generate, based at least in part on data in the key exchange initiator packet, the key without requiring any additional packets to be received from the client device in order to generate the key; and
- send, to the client device, the key exchange response packet that does not include the key.

61. A system as recited in claim 57, wherein the client device is further configured to:
- send, to the server device, a key exchange initiator packet that does not include the key;
- receive, from the server device, a key exchange response packet that does not include the key;
- validate the key exchange response packet; and
- generate, based at least in part on data in the key exchange response packet, the key without requiring any additional packets to be sent to the server device or received from the server device in order to generate the key.

* * * * *